(12) United States Patent
Ordoñez Vicente et al.

(10) Patent No.: US 9,028,361 B2
(45) Date of Patent: May 12, 2015

(54) MODULAR GEAR UNIT FOR A WIND TURBINE

(71) Applicant: Gamesa Innovation & Technology, S.L., Sarriguren (Navarra) (ES)

(72) Inventors: Luis Ordoñez Vicente, Asteasu (ES); Jose Maria Zabala Zabala, Asteasu (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 0 days.

(21) Appl. No.: 13/711,948

(22) Filed: Dec. 12, 2012

(65) Prior Publication Data

US 2013/0157802 A1    Jun. 20, 2013

(30) Foreign Application Priority Data

Dec. 16, 2011    (ES) .................................. 201101325

(51) Int. Cl.
| | |
|---|---|
| *F16H 1/28* | (2006.01) |
| *F03D 11/02* | (2006.01) |
| *F16H 57/08* | (2006.01) |

(52) U.S. Cl.
CPC ...... *F16H 1/28* (2013.01); *F03D 11/02* (2013.01); *F16H 57/082* (2013.01); *F05B 2260/40311* (2013.01); *F16H 2001/289* (2013.01); *Y02E 10/722* (2013.01)

(58) Field of Classification Search
USPC ........................................................ 475/346
See application file for complete search history.

(56) References Cited

U.S. PATENT DOCUMENTS

| | | | | |
|---|---|---|---|---|
| 4,304,152 | A * | 12/1981 | Michling ....................... | 475/330 |
| 7,621,843 | B2 * | 11/2009 | Madge et al. .................. | 475/346 |
| 7,806,799 | B2 * | 10/2010 | Smook et al. .................. | 475/344 |
| 8,016,716 | B2 * | 9/2011 | de Ugarte et al. ............. | 475/331 |

FOREIGN PATENT DOCUMENTS

EP    2 072 858 A1    6/2009

* cited by examiner

*Primary Examiner* — Erin D Bishop
(74) *Attorney, Agent, or Firm* — Ladas & Parry LLP

(57) ABSTRACT

A planetary gear unit (21) of a gearbox of a wind turbine comprising a sun gear (27), planet gears (25, 25'), a ring gear (24), a planet carrier (29) and an outer casing (31); the ring gear (24) being mounted on the outer casing (31); the planet carrier (29) comprising a bogie plate (35) where planet gears (25, 25') are rotatably mounted on planet shafts (41); the planet carrier (29) comprising a main body (51) and a backplate (53) which can be joined/disjoined to the main body (51) for facilitating the assembly/disassembly of the planetary gear unit (21); the planet carrier (29) being rotatably mounted on said outer casing (31) by means of a first bearing (72) in contact with said main body (51) at the rotor side and by means of a second bearing (73) in contact with said backplate (53) at the generator side.

10 Claims, 3 Drawing Sheets

MODULAR GEAR UNIT FOR A WIND TURBINE

FIELD OF THE INVENTION

The present invention relates to a gearbox of a wind turbine and more in particular to a modular gearbox.

BACKGROUND OF THE INVENTION

The main structural components of the drive train in a typical wind turbine are a rotor hub, a main shaft and a gearbox that is connected to the generator by a high-speed shaft. The gearbox housing is connected to the main frame of the wind turbine. The primary purpose of these structural components is to transfer the driving torque generated by the rotor to the generator and increase the shaft speed in order to achieve a suitable rotational speed of the generator rotor. A secondary purpose is to transfer the weight of the rotor, the thrust and the asymmetrical rotor moments, i.e. tilting and yawing moments, to the main frame and thereby further to the tower and the foundation.

In land-based wind turbines, the component integration has been an important driver for their design, understanding component integration as a way to reduce the weight of the drive train and to avoid mutual interference of the external and internal loads on the different components.

An approach in this respect regarding gearboxes can be found in EP 2 072 858 that discloses a compact gearbox design having the planet carrier of the first stage connected directly to the main shaft, without bearings to support it. The gearbox assembles a flexible planet carrier system to avoid an eccentricity of the planet carrier with respect to the ring gear caused by deformations of the main shaft.

The component integration is also a driver for the design of off-shore wind turbines and particularly for their gearboxes but the above-mentioned approach is not appropriate for them because of the larger dimensions they usually have.

There is therefore a need for integrated gearboxes for large wind turbines, particularly off-shore wind turbines The present invention is intended to satisfy said demand.

SUMMARY OF THE INVENTION

It is an object of the present invention to provide a planetary gear unit of a modular type gearbox for large wind turbines that facilitates mounting/dismounting operations of its components.

In one aspect, this and another objects are met by a planetary gear unit comprising a sun gear, planet gears, a ring gear, a planet carrier and an outer casing attached to the wind turbine nacelle, and having the following features: the ring gear is mounted on the outer casing; the planet carrier comprises a bogie plate where planet gears are rotatably mounted on planet shafts by means of bearings at both sides of said bogie plate; the planet carrier comprises a main body and a backplate which can be joined/disjoined to/from the main body for facilitating the assembly/disassembly of the planetary gear unit; the planet carrier is rotatably mounted on said outer casing by means of a first bearing in contact with said main body at the rotor side and by means of a second bearing in contact with said backplate at the generator side.

In one embodiment, said main body extends from the rotor side up to at least up a hypothetical vertical plane (A-A) by the end of the sun gear at the generator side. The union between the main body and the backplate is therefore made at a place where torsion moments are absent.

In one embodiment, the main body comprises a frontal carrier and a plurality of supporting struts of said bogie plate that include contact flanges with said backplate at the generator side. This configuration of the main body of the planet carrier provides suitable means for joining/disjoining the backplate to/from it.

In one embodiment, the backplate comprises an annular-shaped part comprising cooperating areas with said contact flanges for joining/disjoining the backplate to/from the main body and a tubular part protruding from the inner border of the annular-shaped part to be in contact with said second bearing. This configuration of the backplate of the planet carrier benefits assembling/disassembling operations at the planetary gear unit.

Advantageously, the joining means between the backplate and said contact flanges are screws or combinations of screws and pins.

Advantageously, the first and second bearings are cylindrical roller bearings or taper rolling bearings or ball bearings.

In another aspect, the above mentioned objects are met by a gearbox of a wind turbine comprising a planetary gear unit having the above-mentioned features.

Other desirable features and advantages of the invention will become apparent from the subsequent detailed description of the invention and the appended claims, in relation with the enclosed drawings.

DETAILED DESCRIPTION OF THE INVENTION

Figure 1:
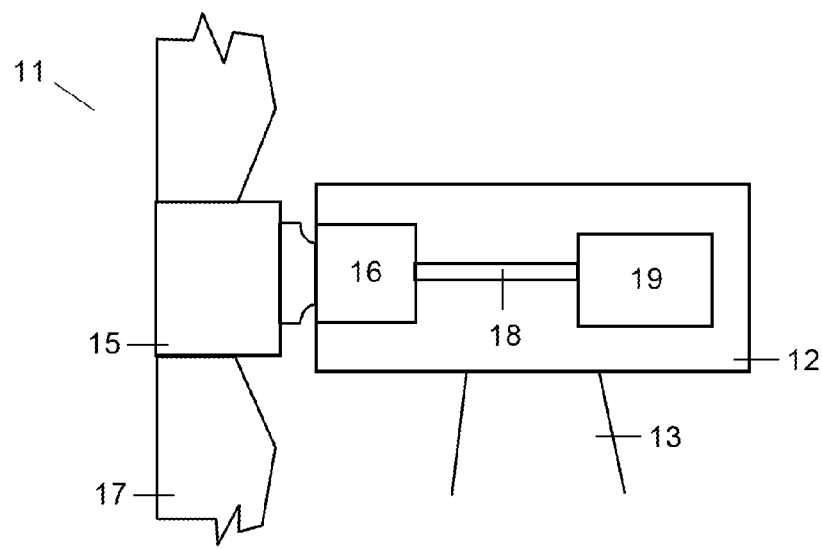
FIG. 1 shows schematically the main components of a wind turbine.

FIG. 1 shows a typical wind turbine 11 comprising a tower 13 supporting a nacelle 12 housing a generator 19 for converting the rotational energy of the wind turbine rotor into electrical energy. The wind turbine rotor comprises a rotor hub 15 and, typically, three blades 17. The rotor hub 15 is connected through a gearbox 16 and a high speed shaft 18 to the generator 19 of the wind turbine for transferring the torque generated by the rotor 15 to the generator 19 in order to achieve a suitable rotational speed of the generator rotor.

Figure 3:
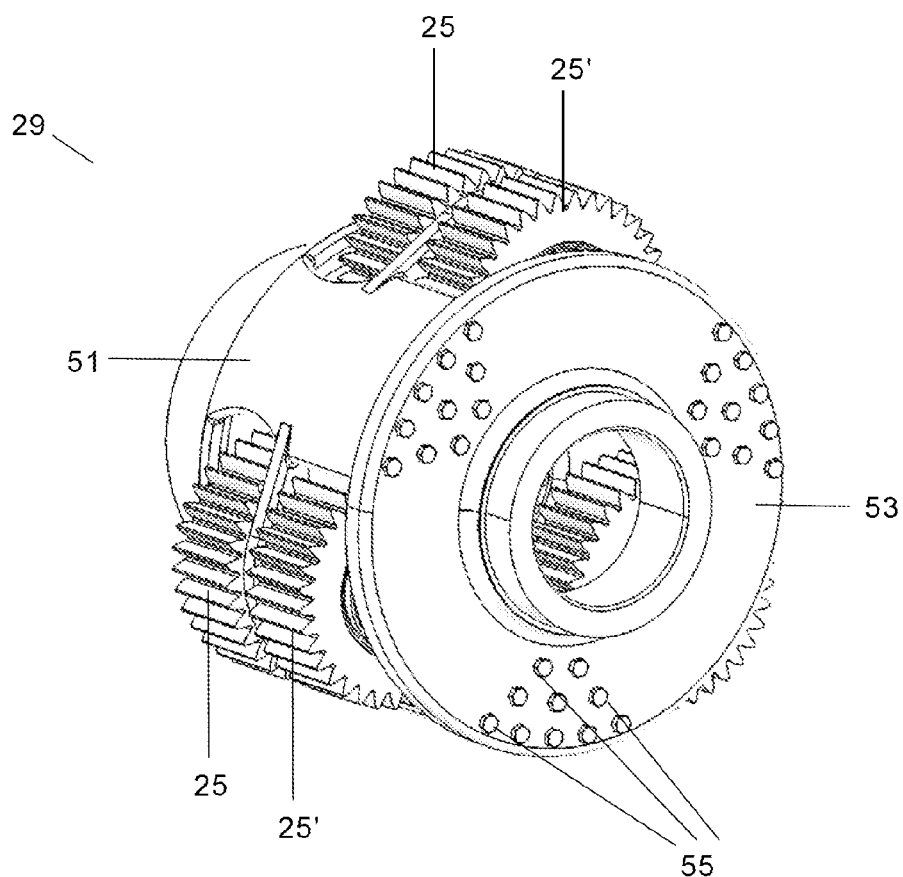
FIG. 3 is a perspective view of the planet carrier of a planetary gear unit according to this invention.
Figure 2:
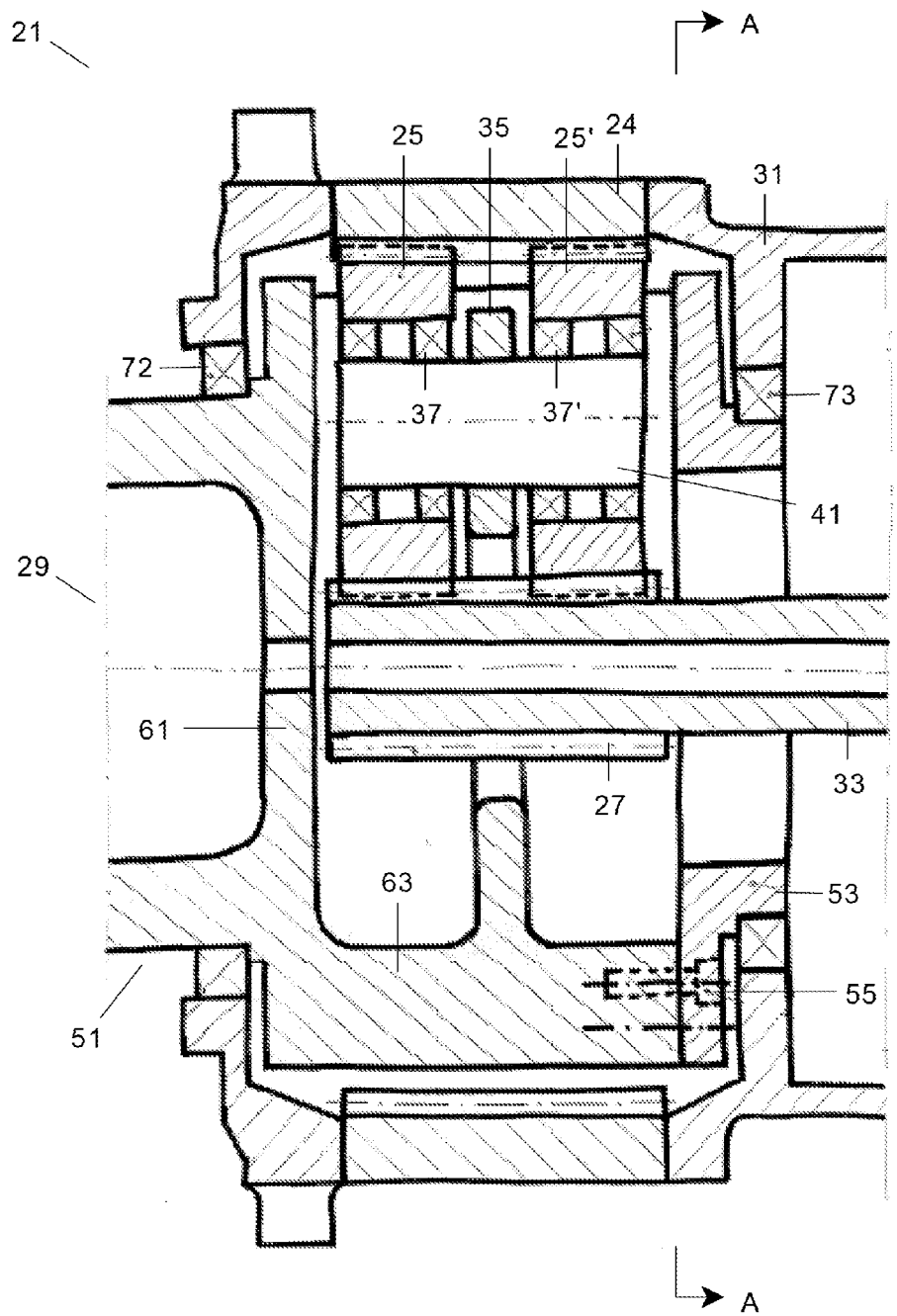
FIG. 2 is a cross-sectional view of a planetary gear unit according to this invention.
Figure 4A:
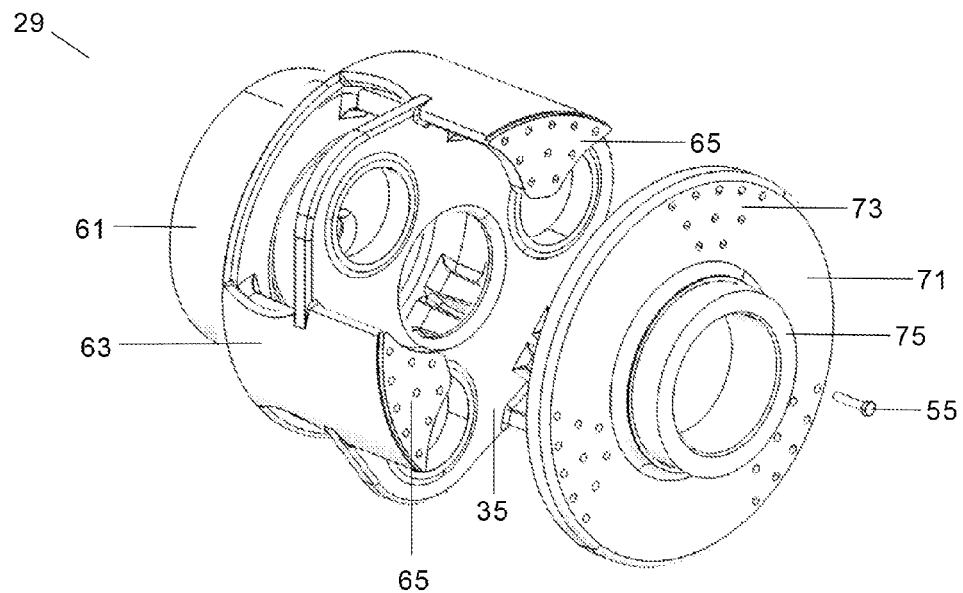
FIGS. 4a and 4b are perspective views of the planet carrier of a planetary gear unit according to this invention showing separately the backplate from other components of the planet carrier.
Figure 4B:
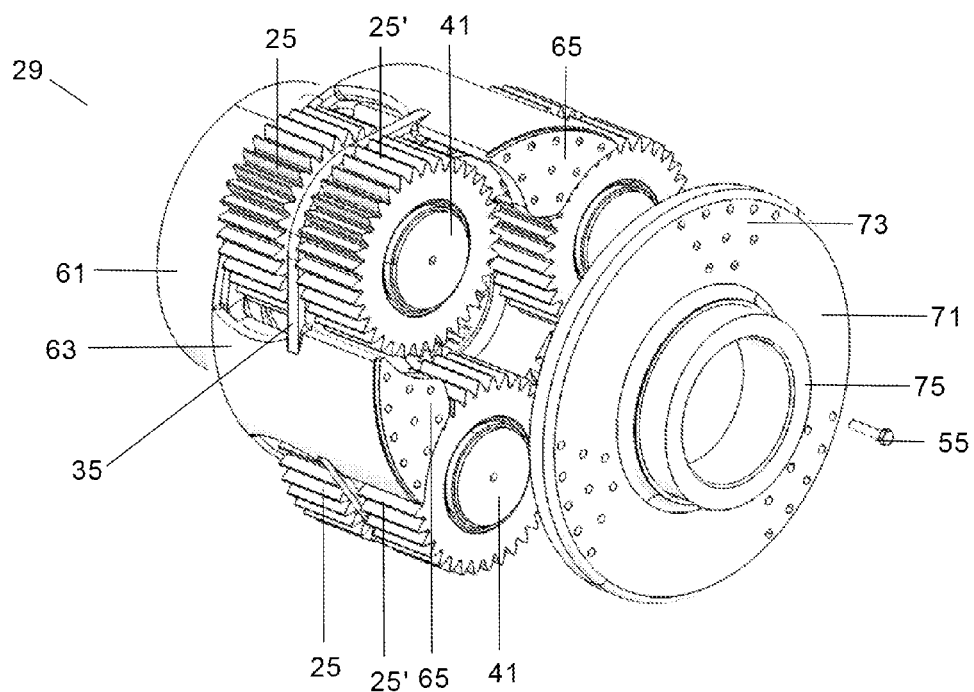

FIGS. 2-4 show a planetary type gear unit 21 according to the present invention.

A gearbox 16 of a wind turbine 11 according to this invention comprises the planetary gear unit 21.

The planetary gear unit 21 comprises planet gears 25, 25', a sun gear 27, a planet carrier 29, an outer casing 31 attached to the nacelle 21 and a ring gear 24 which is mounted on the outer casing 31.

The sun gear 27 is connected to a shaft 33 which connects either to a further gear unit or to the high speed shaft 18.

The planet carrier 29, connected to the rotor hub 15, comprises a bogie plate 35 which supports a plurality of planet shafts 41 on which planet gears 25, 25' are rotatably mounted by means of bearings 37, 37' at both sides of the bogie plate 35. The planet carrier 29 may comprise three, four or five planet shafts 41.

Said bearings 37, 37' may be, for instance, cylindrical roller bearings or taper roller bearings. In both cases they can be whether independent pieces or pieces integrated in the planet gears 25, 25'.

The planet carrier 29 is formed by a main body 51, extending from the rotor side up to, at least, a vertical plane (A-A) by the end of the sun gear 27 at the generator side, and by a backplate 53. The main body 51 and the backplate 53 are joined by suitable reversible joining means 55 such as screws or pins.

The main body 51 comprises a frontal carrier 61 and a plurality of struts 63 protruding from the frontal carrier 61 that include contact flanges 65 with said backplate 53 at the generator side for facilitating its joining/disjoining.

Said struts 63 are the supporting means of the bogie plate 35.

The backplate 53 comprise an annular part 71 and a tubular part 75 protruding from its inner border.

The annular part 71 of the backplate 53 comprise cooperating areas 73 with the flanges 65 of the main body 51 for a joining/disjoining operation between the main body 51 and the backplate 53 using, for example, screws or a combination of screws and pins for facilitating said operation.

The planet carrier 29 is rotatably mounted on the outer casing 31 by means of a first bearing 72 at the rotor side and a second bearing 73 at the generator side. Therefore the first bearing 72 is in contact with the frontal carrier 61 and the second bearing 73 is in contact with the tubular part 75 of the backplate 53.

Said first and second bearings 72, 73 may be, for instance, cylindrical roller bearings, taper roller bearings or ball bearings.

Having the above-mentioned design the torque acting on the rotor hub 15 under action of the rotor blades 17 is transmitted to the planet gears 25, 25' via the planet carrier 29 which is rotatably mounted on the outer casing 31. The interaction of the planet gears 25, 25' with the static ring gear 24 and with the sun gear 27 transmit the torque to the shaft 33.

This arrangement contributes to prevent misalignments of the planet shafts 41 with respect to the ring gear 24. In other words, the sun gear 27, the planet gears 25, 25' and the ring gear 24 are all substantially aligned in an axial direction parallel with the axis of rotation of the planet carrier 29.

On the other hand, the division of the planet carrier 29 in a main body 51 and a backplate 53 allows the mounting of the planets 25, 25' on the main body 51 before joining the backplate 53 to the main body 51. It also allows maintenance operations requiring the separation of the backplate 53 from the main body 51.

The joining of the backplate 53 to the main body 51 at a position close to the second bearing 73 allows that said joining means 55 will only support bending moments and no torsion moments.

It is considered that a gearbox comprising a planetary gear unit 21 according to this invention is particularly applicable to wind turbines of a power bigger than 3 MW.

Although the present invention has been described in connection with various embodiments, it will be appreciated from the specification that various combinations of elements, variations or improvements therein may be made, and are within the scope of the invention.

The invention claimed is:

1. A planetary gear unit (21) of a gearbox of a wind turbine, the planetary gear unit (21) comprising only one central sun gear (27), at least one pair of planet gears (25, 25'), a ring gear (24), a planet carrier (29), and an outer casing (31), the outer casing (31) being attached to a wind turbine nacelle, the ring gear (24) being mounted on the outer casing (31), the planet carrier (29) comprising a bogie plate (35), the bogie plate (35) supporting planet shafts (41), wherein the at least one pair of planet gears (25, 25') is rotatably mounted by means of a first set of bearings (37, 37') on one of the planet shafts (41), one planet gear (25) of the at least one pair of planet gears (25, 25') being placed at one side of said bogie plate (35), and another planet gear (25') of the at least one pair of planet gears (25, 25') being placed at an other side of said bogie plate (35), wherein the planet carrier (29) comprises a main body (51) and a backplate (53) which can be joined/disjoined to/from the main body (51) for facilitating assembly/disassembly of the planetary gear unit (21), and wherein the planet carrier (29) is mounted on said outer casing (31) by means of a first bearing (72) and a second bearing (73), wherein the first bearing (72) and the second bearing (73) form a second set of bearings, the first bearing (72) being in contact with said main body (51) at a rotor side of the planetary gear unit (21) so that the planet carrier (29) is able to rotate, and the second bearing (73) being in contact with said backplate (53) at a generator side of the planetary gear unit (21).

2. The planetary gear unit (21) according to claim 1, wherein said main body (51) of the planet carrier (29) extends from the rotor side of the planetary gear unit (21) to at least a hypothetical vertical plane (A-A) that is located by an end of the sun gear (27) at the generator side of the planetary gear unit (21).

3. The planetary gear unit (21) according to claim 1, wherein the main body (51) of the planet carrier (29) comprises a frontal carrier (61) and a plurality of struts (63) to support the bogie plate (35), the struts (63) include, at the generator side of the planetary gear unit, contact flanges (65) with said backplate (53) for joining/disjoining the backplate (53) to/from the main body (51).

4. The planetary gear unit (21) according to claim 3, wherein said backplate (53) comprises an annular-shaped part (71) and a tubular, part (75), the annular-shaped part (71) comprising cooperating areas (73) with said contact flanges (65) for joining/disjoining the backplate (53) to/from the main body (51), and the tubular part (75) protruding from an inner border of the annular-shaped part (71) and being in contact with said second bearing (73).

5. The planetary gear unit (21) according to claim 4, wherein the backplate (53) is joined to said contact flanges (65) by means of screws.

6. The planetary gear unit (21) according to claim 4, wherein the backplate (53) is joined to said contact flanges (65) by a combination of screws and pins.

7. The planetary gear unit (21) according to claim 1, wherein said first bearing (72) is a cylindrical roller bearing or a taper rolling bearing or a ball bearing.

8. The planetary gear unit (21) according to claim 1, wherein said second bearing (73) is a cylindrical roller bearing or a taper rolling bearing or a ball bearing.

9. The gearbox of the wind turbine comprising the planetary gear unit (21) according to claim 1.

10. The wind turbine comprising the gearbox according to claim 9.

* * * * *